US008862885B2

(12) United States Patent
Hamann et al.

(10) Patent No.: US 8,862,885 B2
(45) Date of Patent: Oct. 14, 2014

(54) ARTICLE OF MANUFACTURE HAVING BIOMETRIC DATA EVALUATION CAPABILITY

(75) Inventors: Ulrich Hamann, Berlin (DE); Manfred Paeschke, Basdorf (DE); Joerg Fischer, Berlin (DE); Joachim Kloeser, Berlin (DE)

(73) Assignee: BUNDESDRUCKEREI GmbH, Berlin (DE)

( * ) Notice: Subject to any disclaimer, the term of this patent is extended or adjusted under 35 U.S.C. 154(b) by 55 days.

(21) Appl. No.: 13/500,055

(22) PCT Filed: Sep. 30, 2010

(86) PCT No.: PCT/EP2010/064526
§ 371 (c)(1),
(2), (4) Date: Aug. 27, 2012

(87) PCT Pub. No.: WO2011/042349
PCT Pub. Date: Apr. 14, 2011

(65) Prior Publication Data
US 2012/0311719 A1   Dec. 6, 2012

(30) Foreign Application Priority Data
Oct. 9, 2009   (DE) .......................... 10 2009 045 544

(51) Int. Cl.
| | |
|---|---|
| *G06F 21/00* | (2013.01) |
| *B42D 25/00* | (2014.01) |
| *H04L 9/32* | (2006.01) |
| *G06F 21/32* | (2013.01) |
| *G07C 9/00* | (2006.01) |

(52) U.S. Cl.
CPC ............... *B42D 15/10* (2013.01); *H04L 9/3234* (2013.01); *G07C 2209/14* (2013.01); *G06F 21/32* (2013.01); *G07C 2009/00095* (2013.01)
USPC ............................................. 713/172; 726/27

(58) Field of Classification Search
CPC ............................... G06F 21/32; H04L 9/3234
USPC ........................................................... 726/27
See application file for complete search history.

(56) References Cited

U.S. PATENT DOCUMENTS

| | | | |
|---|---|---|---|
| 6,522,772 B1 * | 2/2003 | Morrison et al. | 382/124 |
| 7,047,418 B1 * | 5/2006 | Ferren et al. | 713/186 |
| 7,254,619 B2 * | 8/2007 | Mekata et al. | 709/217 |
| 2002/0148900 A1 | 10/2002 | Gurevich et al. | |

(Continued)

FOREIGN PATENT DOCUMENTS

| | | |
|---|---|---|
| DE | 10304775 | 10/2004 |
| DE | 102007050480 A1 | 4/2009 |

(Continued)

*Primary Examiner* — Hadi Armouche
*Assistant Examiner* — Bryan Wright

(57) ABSTRACT

An article of manufacture having a document body constructed from document layers arranged on top of each other, with a first document layer having an evaluation unit, a second document layer having a first acquisition unit for collecting first biometric data, a third document layer having a second acquisition unit for collecting second biometric data, wherein the evaluation unit is connected to the first and second acquisition units in order to receive the first and second biometric data, the evaluation unit constructed for evaluating the first and second biometric data in order to activate a function of the article of manufacture depending on a result of the evaluation.

12 Claims, 2 Drawing Sheets

(56) References Cited

U.S. PATENT DOCUMENTS

| | | |
|---|---|---|
| 2004/0014457 A1* | 1/2004 | Stevens .................. 455/414.1 |
| 2005/0211784 A1 | 9/2005 | Justin |
| 2006/0131393 A1 | 6/2006 | Cok |
| 2007/0189581 A1 | 8/2007 | Nordentoft et al. |
| 2008/0067247 A1 | 3/2008 | McGregor |
| 2009/0087651 A1 | 4/2009 | Doublet et al. |
| 2009/0145972 A1 | 6/2009 | Evans |
| 2009/0199004 A1* | 8/2009 | Krawczewicz et al. ....... 713/172 |
| 2010/0007726 A1* | 1/2010 | Barbieri et al. ................ 348/78 |

FOREIGN PATENT DOCUMENTS

| | | |
|---|---|---|
| DE | 102008046343 | 11/2010 |
| GB | 2420098 A | 5/2006 |
| JP | 2002230553 | 8/2002 |
| JP | 2006072890 | 3/2006 |
| WO | WO02073153 | 9/2002 |
| WO | 2006069158 A2 | 6/2006 |
| WO | WO 2009/076521 | 6/2009 |
| WO | 2009097604 A1 | 8/2009 |

* cited by examiner

ARTICLE OF MANUFACTURE HAVING BIOMETRIC DATA EVALUATION CAPABILITY

The present invention relates to a document, in particular a high-value or security document, for example an identity document.

Various documents are already known from the prior art, which contain an integrated electronic circuit, for example, a so-called RFID chip, like, for example, in DE10 2005 025 806.9.

In contrast, the object of the invention is to create an improved document.

The object of the invention is achieved with the features of claim 1. Embodiments of the invention are specified in the dependent claims.

According to embodiments of the invention, the document is a high-value or security document such as, for example, an ID document, i.e. an identity document such as, for example, an identity card, passport, driving license or company ID card, or a means of payment such as, for example, a bank note, credit card, or another credential such as, for example, an entrance ticket, consignment note, visa or the like. The document can be constructed from paper and/or plastic. In particular, the document can be configured as a book or card. Furthermore, the document can be a smart card.

According to embodiments of the invention, the document has a document body which is constructed from a plurality of document layers arranged on top of each other. The individual document layers can be composed of plastic or paper. For example, the individual document layers are each approximately the same shape and size, so that, layered on top of each other, they form, for example, a card-shaped document body. To this end, the document layers can be laminated onto each other.

A first document layer contains an evaluation unit. This can be a semi-conductor circuit which is designed, for example, as a silicon-based or polymer-electronic circuit. For example, the evaluation unit can be implemented by means of a chip which is located on or in the first document layer. The evaluation unit can be constructed from polymer-electronic components which, for example, are applied to the first document layer using printing technology.

A second document layer contains a first acquisition unit for collecting the first biometric data and a third document layer contains a second acquisition unit for collecting the second biometric data. The first and second biometric data can be different types of biometric data such as, for example, fingerprint data, iris scan data, facial biometric data, genetic data, in particular DNA sequence data.

For example, the first or second acquisition unit can be configured as a fingerprint sensor for collecting a user's fingerprint data, or as an electronic camera for collecting iris scan data or facial biometric data. For example, the first or second acquisition unit can be configured as a microsystem for performing a DNA sequencing process on the user's DNA, in particular a so-called DNA Micro Total Analysis System (TAS) with, for example, subcutaneous sampling, whereby the DNA sequencing is performed by means of a sample taken from the user, which then provides the biometric data.

According to one embodiment of the invention, the evaluation unit is configured to perform a co-called "match on card" procedure. To this end, the document has a first memory region for storing the first reference data for the first biometric data and a second memory region for storing the second reference data for the second biometric data. The first reference data is used for performing a "match on card" procedure with regard to the first biometric data and the second reference data is used for performing a "match on card" procedure for the second biometric data; the "match on card"-on-Card procedure being performed in each case by the evaluation unit.

The evaluation unit is configured such that the result of the "match on card" procedure with regard to the first reference data and the first biometric data is a first so-called confidence value, and that the result of performing the "match on card" procedure with regard to the second reference data and the second biometric data is a second confidence value. These first and second confidence values can be processed further by the evaluation unit, for example to check a user's usage authorization.

For example, the evaluation unit can be configured such that the function of the document is activated if at least one of the first and second confidence values is above a first threshold value. The evaluation unit can further be such that if none of the first or second confidence values are above the first threshold value, it is checked whether both the first and the second confidence values are above a second threshold value, the second threshold value being below the first threshold value. If one of these conditions is met, i.e. if at least one of the first and second confidence values is above the first threshold value, or if both the first and second confidence values are above the second threshold value, then the user is regarded as identified, and authorized to use the function of the document, which in turn enables the document.

The evaluation unit can also be configured such that the function is activated if the result of a calculation operation which uses the first and second confidence values is above the second threshold value. This calculation operation can be a linear combination of the first and second confidence values.

The function of the document can be any smart card function, such as, for example, a cryptographic function for decrypting and/or encrypting data, in particular a function for generating an electronic signature, a payment function, a data storage or data reading function for accessing an electronic memory in the document, or any other function for making available a digital identity of the user of the document, for example on a network, in particular the Internet.

According to one embodiment of the invention, the document has an electronic memory for storing sensitive data and a, for example, optical and/or wireless or contact-based interface for outputting the sensitive data. The function of the document here is the execution of a read access on the sensitive data and its output via the interface, the evaluation unit being configured to perform a cryptographic procedure for protecting the sensitive data, and a necessary requirement for outputting the sensitive data via the interface being that the first and second biometric data fulfil a predetermined criterion which is to be checked by means of the evaluation.

For example, the evaluation unit can be configured for performing a so-called Basic Access Control (BAC) procedure and/or an Extended Access Control (EAC) procedure, such procedures being standardized by the International Civil Aviation Organisation (ICAO).

According to one embodiment of the invention, a fourth document layer contains a display device which is connected to the evaluation unit, so that the evaluation unit can control the display device. A driver circuit for the display device can thus be implemented as part of the evaluation unit or as part of the display device itself, or as a separate circuit on a further document layer.

The display device can be configured such that image data can be shown even without a constant energy supply. Such displays only require electrical energy when the image data to be shown changes. In this case, the display devices are, for example, bistable displays such as, for example, electrophoretic displays, electrochromic displays, rotary element displays, ferroelectric displays, displays based on the electrowetting effect as well as bistable LCD displays, for example, twisted nematic, super twisted nematic, cholesteric or nematic LCD displays. Furthermore, the display devices can also be hybrid displays which combine different display technologies with each other.

Furthermore, the display device can be a flexible, bistable display, as is known, for example, from US 2006/0250534 A1. Further bistable electrophoretic displays are known, for example, from WO 99/53371 and EP 1 715 374 A1.

Bistable displays are also called "Electronic Paper Displays" (EPD).

Such bistable displays generally have the advantage that they can be easily read in bright light, and that no energy supply is required in order to display the same image data over a long period.

The display device can be an emissive display such as, for example, an LED display, in particular an inorganic, organic or hybrid LED display. Such displays can be realized based on thin film transistors (TFTs), in particular transparent TFTs, such as are known, for example, from P. Görrn, P. Holzer, T. Riedl, W. Kowalsky, J. Wang, T. Weimann, P. Hinze, and S. Kipp: Stability of transparent zinc tin oxide transistors under bias stress, Appl. Phys. Lett. 90, 063502 (2007); Proceedings of SPIE—Volume 6486; Light-Emitting Diodes: Research, Manufacturing, and Applications XI, Klaus P. Streubel, Heonsu Jeon, Editors, 64860F (Feb. 13, 2007) and Thin-film transistors with transparent amorphous zinc indium tin oxide channel layer, M. S. Grover et al, 2007, J. Phys. D: Appl. Phys. 40 1335-1338.

The production of TFTs by direct application by means of printing technology is known per se from WO 03/098696 A1.

An emissive display device can also be realized based on an electroluminescent medium, such as is known, for example, from US 2002/0079494 A1 and U.S. Pat. No. 6,091,194. The advantage of emissive displays is that they can be read without illumination and that a colour reproduction can be easily achieved.

Both bistable and emissive displays can be configured as segment displays, passive or active matrix, cf. here US 2006/0240603 A1.

Both bistable and emissive displays can be produced in reflective and transparent embodiments, as is known per se from the current state of the art.

The document can have one or several similar or different display devices on the same or different document layers. For example, the document can have an emissive display device on which an image is only rendered if, for example, inductive energy is coupled into the document. The document can have a bistable display device on the same or a different document layer, on which an image is rendered permanently and independently of the coupling of electrical energy.

According to one embodiment of the invention, the output of at least one part of the sensitive data occurs via the display device of the document, the optical output of the data occurring in plain text or in a form which cannot be visually and/or cognitively ascertained by a user, for example by sending an optical machine-readable signal via the display device.

According to one embodiment of the invention, the document has a document layer with a volume hologram. The volume hologram can preferably contain controllable optical lens elements. The volume hologram comprising the controllable lens elements can be arranged in an optical path of the electronic camera of the document; the volume hologram or its controllable optical lens elements being able to be controlled by the evaluation unit, in order to allow, for example, a close-up, depending on control, for example, for capturing fingerprints or a portrait photo for collecting facial biometric data.

According to a further embodiment, at least one of the document layers contains an optical security feature, which can be applied, for example using printing technology such as gravure printing, in particular intaglio printing and photogravure printing, screen printing, offset printing, relief printing (letterset), in particular indirect relief printing, or by means of personalization processes such as, for example, thermal transfer printing, inkjet printing or laser personalization.

In particular, the document can have one or several of the following optical security features:

Guilloches: guilloches are printed on the document by means of so-called linear printing. They generally consist of wave and loop patterns printed on top of each other in different colours;

Microprint: this is printed writing in the smallest of fonts. The microprint can hardly be seen with the naked eye. For example, on Euro banknotes microprint is incorporated into the motifs as an image element. The microprint can be read by using a magnifying lens;

Metameric systems: because of metamerically identical colours, differing spectral compositions of light cause the same colour impression in human beings and are made optically perceptible, for example, by means of colour filters or variable light sources;

Imprints using fluorescent, phosphorescent and/or up-conversion inks;

Imprints using infrared ink: the ink can only be detected under infrared radiation by scanners with the corresponding sensors. For example, Euro banknotes are equipped with this optical security feature;

Barcodes, in particular, one- or two-dimensional barcodes, monochrome or polychrome;

Optical Variable Ink (OVI): with an optically variable ink, the colour impression changes depending on the viewing angle, as the light on the pigments is refracted, scattered or reflected;

Holograms and kinegrams (transparent or reflective);

Watermarks;

Digital watermarks which carry visible and/or machine-readable information;

Register printing: different patterns or symbols are printed on top of, or next to, each other such that, together, they create a certain picture. Very small irregularities in the position, i.e. so-called layer inaccuracies, can easily be seen with the naked eye. If the partial images are on different sides of the document, such as, for example, on a bank note, this optical security feature is called a see-through register;

See-through window: a window made of a transparent plastic film is incorporated into the document;

Mixed fibres: fibres which glow in different colours under UV light are mixed with the paper of the document;

Security threads;

Micro-perforation.

Embodiments of the invention are explained in more detail below with reference to the drawings, in which.

Elements of the following embodiments which correspond to each other are denoted respectively by the same reference signs.

Figure 1:
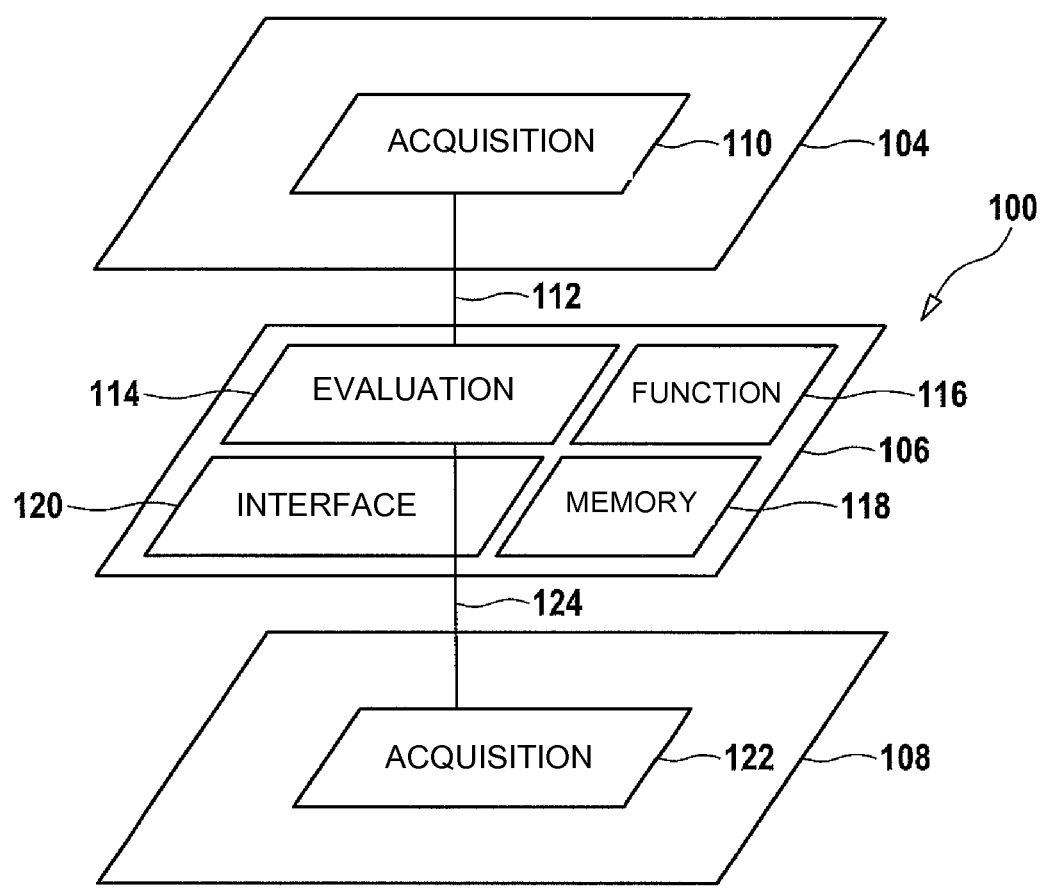
FIG. 1 is a block diagram of an embodiment of a document according to the invention, in exploded view.

FIG. 1 shows an embodiment of a document 100 according to the invention, in exploded view. In the embodiment shown here, the document 100 has a document body 102 (cf. FIG. 2) which is constructed from at least 3 document layers of the document 100, namely from the document layers 104, 106 and 108.

The document layer 104 contains an acquisition unit 110 for collecting the first biometric data. For example, the acquisition unit 110 is a microsystem for performing a DNA sequencing process, the microsystem being configured to take a sample from a user, in particular configured for subcutaneous sampling. In particular, the acquisition unit 110 can be configured as a so-called DNA Micro Total Analysis System (TAS). The biometric data collected by the acquisition unit 110 is a DNA sequence of a user of the document 100 from whom the sample has been taken.

The acquisition unit 110 is connected to an electronic circuit of the document 100 which is located on the document layer 106, for example, by means of a so-called via 112 which runs in a vertical direction through the document body 102. The biometric data collected from the acquisition unit 110 is transmitted by means of the via to an evaluation module 114 of the electronic circuit, so it can be evaluated there. The electronic circuit of the document layer 106 has, in addition, a function module 116 for executing a function of the document 100, a prerequisite for executing the function being that the function module 116 is activated from the evaluation module 114.

The electronic circuit of the document layer 106 has, in addition, at least one electronic memory 118 and a communication interface 120.

Notwithstanding the embodiment according to FIG. 1, the evaluation module 114, the function module 116, the memory 118 and the communication interface 120 can be arranged entirely or partially on different document layers of the document 100, and can, for example, communicate with each other by means of further vias.

The memory 118 can have a first memory region for storing the first reference data for the biometric data supplied by the acquisition unit 110, and a second memory region for storing the second reference data for biometric data supplied by an acquisition unit 122.

The communication interface 120 can be an optical interface such as, for example, an LED or a display device, a contact-based interface such as, for example, a contact-based smart card interface, a contactless interface such as, for example, an RFID interface or a so-called dual mode interface which allows both contact-based and contactless communication.

For example, the communication interface 120 is configured to execute an RFID communication procedure. As well as communication, for example, with an external scanning device (not shown in the figures), the communication interface 120 can also be used for coupling electrical energy to the document 100, in particular for inductive coupling via an induction field, in order to supply the electronic circuit of the document and its further active components such as, for example, the acquisition units 110 and 122, with electrical energy.

The acquisition unit 122 is located on the document layer 108 and is connected to the evaluation module 114 by means of a via 124, using which the acquisition unit 122 inputs biometric data into the evaluation unit 114, so this biometric data can be evaluated there. For example, the acquisition unit 122 is configured as an electronic camera, in particular as a charge-coupled device (CCD) array or as an active-pixel sensor (APS) which is manufactured using CMOS technology, in order to collect one or several biometric features from a user of the document 100, such as facial biometric data.

The evaluation module 114 is configured to evaluate the biometric data supplied from the acquisition units 110 and 122, in order to activate the function module 116 depending on a result of this evaluation. The activation can occur as a result of the evaluation module 114 generating an activation signal if the result of the biometric data evaluation fulfils a predetermined criterion, whereat a switching operation is initiated by the activation signal, which activates the function module 116, so that it can carry out its function.

For example, the evaluation of the biometric data is carried out via the evaluation module 114 in such a way that, for the biometric data supplied from the acquisition unit 110 and for the biometric data supplied by the acquisition unit 122, a "match on card" procedure is carried out in each case by means of the first and second reference data stored in the memory 118, in order to check whether the biometric data collected corresponds sufficiently with the respective reference data. Thus a first confidence value is supplied for the biometric data supplied from the acquisition unit 110 and a second confidence value is supplied for the biometric data supplied from the acquisition unit 122, the confidence values indicating in each case the probability that the user from whom each biometric feature has been detected, is the same user for whom the relevant reference data is stored in the memory 118.

The evaluation module can be configured in such a way that the activation signal for the function module 116 is generated if at least one of the first and second confidence values is above a first threshold value. The evaluation module 114 can further be configured in such a way, that if this is not the case, it is checked whether both the first and the second confidence values are above a second threshold value, the second threshold value being below the first threshold value. For example, the first threshold value can be 99% and the second threshold value 80%.

This has the advantage that an activation of the function module 116 can even occur when, for example, a high-quality acquisition of one of the biometric features of the user is temporarily not possible. This can be the case, for example, when the acquisition unit 122 is configured to collect fingerprint data and the user has an injured finger. If, in this case, the biometric data supplied by the acquisition unit 110 gives a high confidence value, then the user can still use the document 100.

According to one embodiment of the invention, sensitive data is stored in the electronic memory 118. This can be, for example, personal information about the user of the document such as, for example, name, address, place of residence which is only affected if the relevant defined conditions are met.

A necessary condition for such a read access and the output of the sensitive data via the interface 120 can be that the evaluation of the biometric data supplied by the acquisition units 110 and 122 produces confidence values, of which at least one is above the first threshold value, or, if this is not the case, both confidence values are above the second threshold value. If this requirement is met, the evaluation module 114 generates an activation signal for the function module 116 which, as a result, reads at least one part of the sensitive data from the memory 118 and outputs it via the interface 120, for example, to an external scanning device.

Further requirements which must be met for the output of sensitive data can be, for example, the execution of a BAC and/or EAC procedure.

Figure 2:
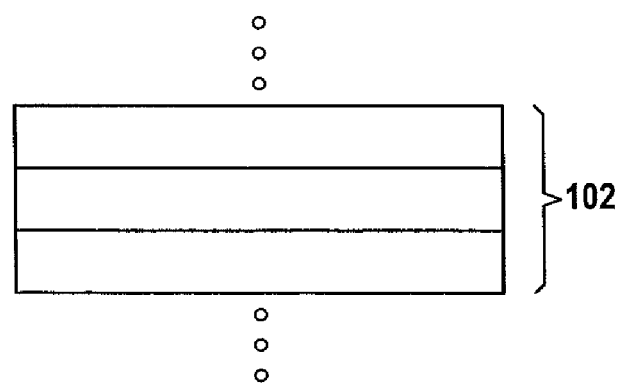
FIG. 2 is a lateral view of the document according to FIG. 1.

FIG. 2 shows a lateral view of the document 100 from FIG. 1, the document 100 being able to have further document layers in addition to the three document layers 104, 106 and 108 shown.

Figure 3:
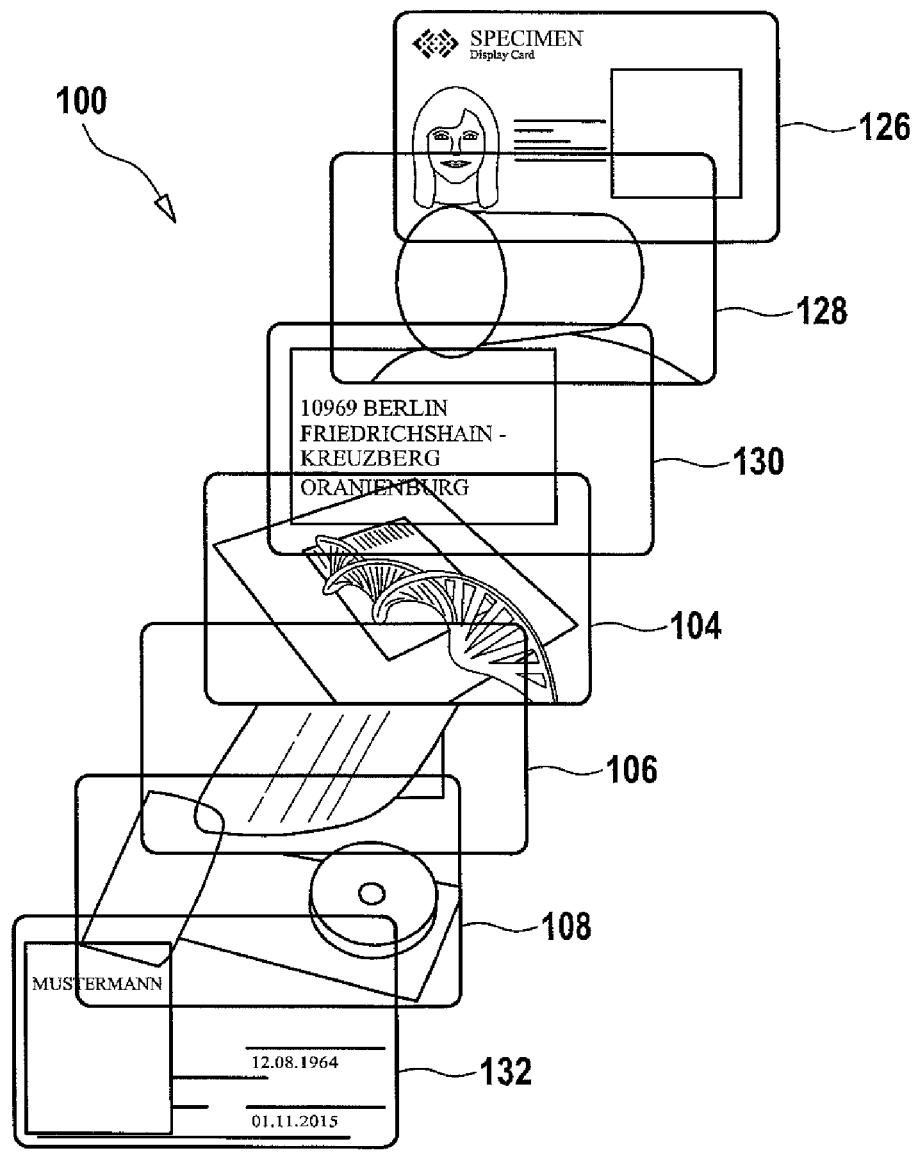
FIG. 3 is a further embodiment of a document according to the invention, in exploded view.

FIG. 3 shows a further embodiment of a document 100 according to the invention. As well as document layers 104, 106 and 108 (cf. embodiments of FIGS. 1 and 2), the document has here further document layers 126, 128, 130 and 132.

The document layer 126 contains one or several optical security features and can be produced using printing technology. In particular, the document layer 126 can carry personalized information.

The document layer 128 can have a display device such as, for example, a transparent OLED display device, and/or a touchpad, in particular a so-called multi-touchpad which can detect two or more fingers simultaneously, and/or a further acquisition unit for detecting biometric features such as, for example, a fingerprint sensor. A manipulandum can be provided by means of the touchpad, using which a user can, for example, input commands into the document 100, for example to navigate through an image sequence shown on the display device.

The document layer 130 can contain a further display device which, for example, is configured as a bistable display device, in particular as so-called e-paper.

The document layer 104 can be configured such as, for example, in the embodiment of FIG. 1, i.e. the acquisition unit 110 of the document layer 104 can be configured as a DNA Micro-TAS with, for example, subcutaneous sampling.

The document layer 106 can be configured such as in the embodiment of FIG. 1, i.e. the document layer can contain an electronic circuit such as, for example, a processor or any other logic circuit, to perform in particular the evaluation of the biometric data supplied from the different acquisition units, to activate and effect the function, and to control the various display devices of the document 100, and a communication interface, for example as a scanner.

The document layer 108 can be configured such as in the embodiment of FIG. 1, i.e. the acquisition unit 110 can be configured, for example, as an electronic camera, for example as a camera chip. Furthermore, an electronic circuit for the power management can be arranged on the document layer 108, in particular in order to protect the electronic circuit of the document layer 106 from high voltage which can arise from the inductive coupling of energy. The power management can, in particular, contain a circuit for protecting the electronic circuit of the document layer 106 from high voltage.

The document layer 132 which is arranged underneath the document layer 108 can have a volume hologram with controllable optical lens elements, the lens elements of the electronic circuit of the document layer 106 being able to be controllable. The volume hologram can be arranged in front of the camera chip so that the optical properties of the camera can be varied by controlling the optical elements, for example, for a close-up for capturing a fingerprint or for a portrait photo for collecting facial biometric data.

LIST OF REFERENCE NUMERALS

100 Document
102 Document body
104 Document layer
106 Document layer
108 Document layer
110 Acquisition unit
112 Via
114 Evaluation module
116 Function module
118 Memory
120 Communication interface
122 Acquisition unit
124 Via
126 Document layer
128 Document layer
130 Document layer
132 Document layer

What is claimed is:

1. An article of manufacture, comprising:
a document body which is constructed from a plurality of document layers composed of plastic and/or paper and arranged on top of each other, wherein a first layer of the document layers contains an evaluation unit, a second layer of the document layers contains a first acquisition unit for collecting a first set of biometric data, a third layer of the document layers contains a second acquisition unit for collecting a second set of biometric data, and wherein the evaluation unit is connected to at least the first and second acquisition units, in order to receive at least the first and second sets of biometric data from the acquisition units, the evaluation unit being constructed for evaluating the first and second sets of biometric data supplied from the first and second acquisition units, in order to activate a function of the article of manufacture depending on a result of the evaluation,
a first memory region for storing a first set of reference data for the first set of biometric data, and a second memory region for storing a second set of reference data for the second set of biometric data, wherein the evaluation unit is configured in such a way, that a first confidence value is determined from the first set of reference data and the first set of biometric data, and that a second confidence value is determined from the second set of reference data and the second set of biometric data,
wherein the evaluation unit is configured in such a way, that the function is activated if the result of a calculation operation into which the first and second confidence values are input, is above a second threshold value.

2. The article of manufacture according to claim 1, wherein the first and second sets of biometric data are different types of biometric data.

3. The article of manufacture according to claim 2, wherein the first or the second set of biometric data is one of the following types of biometric data: fingerprint data, iris scan data, facial biometric data, or genetic data, in particular DNA sequence data.

4. The article of manufacture according to claim 1, wherein the evaluation unit is configured in such a way that the function is activated if one of the first and second confidence values is above a first threshold value.

5. The article of manufacture according to claim 1, wherein the calculation operation is a linear combination of the first and second confidence values.

6. The article of manufacture according to claim 1, further comprising an electronic memory for storing sensitive data and an
interface for outputting the sensitive data, wherein the function is the execution of a read access on the sensitive data, and wherein the evaluation unit is configured to perform a cryptographic process for protecting the sensitive data, a necessary requirement for outputting the sensitive data via the interface being that the first and second sets of biometric data fulfill a predetermined criterion which is to be checked via the evaluation.

7. The article of manufacture according to claim 1, wherein at least a fourth layer of the document layers contains a display device which is connected to the evaluation unit such that the evaluation unit can control the display device.

8. The article of manufacture according to claim 6, wherein at least a fourth layer of the document layers contains a display device which is connected to the evaluation unit such that the evaluation unit can control the display device, and the evaluation unit is configured in such a way that the display device is controlled to display at least one part of the sensitive data after the function has been activated.

9. The article of manufacture according to claim 1, further comprising a coupling component capable of providing inductive coupling of electrical energy to the power supply of at least the evaluation unit.

10. The article of manufacture according to claim 1, wherein the first acquisition unit is configured as an electronic camera.

11. An article of manufacture, comprising:
a document body which is constructed from a plurality of document layers composed of plastic and/or paper and arranged on to of each other,
wherein a first layer of the document layers contains an evaluation unit, a second layer of the document layers contains a first acquisition unit for collecting a first set of biometric data, a third layer of the document layers contains a second acquisition unit for collecting a second set of biometric data,
wherein the evaluation unit is connected to at least the first and second acquisition units, in order to receive at least the first and second sets of biometric data from the acquisition units, the evaluation unit being constructed for evaluating the first and second sets of biometric data supplied from the first and second acquisition units, in order to activate a function of the article of manufacture depending on a result of the evaluation, and
wherein the first acquisition unit is configured as an electronic camera, and
a volume hologram with controllable optical lens elements, wherein the volume hologram is arranged in an optical path of the electronic camera, the volume hologram being able to be controlled by the evaluation unit.

12. The article of manufacture according to claim 1, wherein at least a fifth layer of the document layers contains an optical security feature.

* * * * *